United States Patent [19]

Veneziano

[11] Patent Number: 4,553,207

[45] Date of Patent: Nov. 12, 1985

[54] METHOD AND APPARATUS FOR DERIVING FUEL CONSUMPTION DATA FROM A HYDRAULICALLY DRIVEN FUEL INJECTOR

[75] Inventor: Marcello Veneziano, Novi, Mich.

[73] Assignee: Ford Motor Company, Dearborn, Mich.

[21] Appl. No.: 430,221

[22] Filed: Sep. 30, 1982

[51] Int. Cl.[4] ................ G01M 15/00; F02D 5/02; F02M 51/06

[52] U.S. Cl. .................... 364/431.01; 73/119 A; 364/431.12

[58] Field of Search ............... 364/431.01, 431.04, 364/442, 431.07, 431.12; 73/113, 114, 119 A

[56] References Cited

U.S. PATENT DOCUMENTS

| | | | |
|---|---|---|---|
| 3,344,663 | 10/1967 | Dreisin et al. | 73/119 |
| 4,002,062 | 1/1977 | Kuno et al. | 73/114 |
| 4,012,948 | 3/1977 | Kuno et al. | 73/113 |
| 4,046,998 | 9/1977 | Kuno et al. | 364/442 |
| 4,061,023 | 12/1977 | Kuno et al. | 364/442 X |
| 4,150,431 | 4/1979 | Lauterbach | 364/442 |
| 4,163,282 | 7/1979 | Yamada et al. | 364/431.06 |
| 4,184,458 | 1/1980 | Aoki et al. | 123/492 |
| 4,199,812 | 4/1980 | Klotzner et al. | 364/431.05 |
| 4,209,829 | 6/1980 | Leichle | 364/442 |
| 4,254,744 | 3/1981 | Mizote | 123/480 |
| 4,276,601 | 6/1981 | Tokuda et al. | 364/431.05 |
| 4,296,722 | 10/1981 | Furuhashi et al. | 123/492 |
| 4,307,452 | 12/1981 | Mizote | 364/442 |
| 4,309,759 | 1/1982 | Tokuda et al. | 364/431.05 |
| 4,310,889 | 1/1982 | Imai et al. | 364/431.04 |
| 4,404,847 | 9/1983 | Larson | 73/113 X |
| 4,438,496 | 3/1984 | Ohie | 364/431.07 |
| 4,443,852 | 4/1984 | Kobayashi et al. | 364/431.03 |
| 4,448,067 | 5/1984 | Engelbrecht et al. | 73/119 A |

*Primary Examiner*—Felix D. Gruber
*Attorney, Agent, or Firm*—Paul K. Godwin, Jr.; Robert D. Sanborn

[57] ABSTRACT

An injector mounted sensor, providing an electrical signal indicative of the opening and closing of a hydraulically actuated injector valve, is monitored to determine the time period for which the injector valve is opened and to determine the frequency rate at which said injector valve is opened. The time period and frequency rate are compared with a predetermined table of values to derive a fuel consumption value for each time period that the injector valve is open.

4 Claims, 8 Drawing Figures

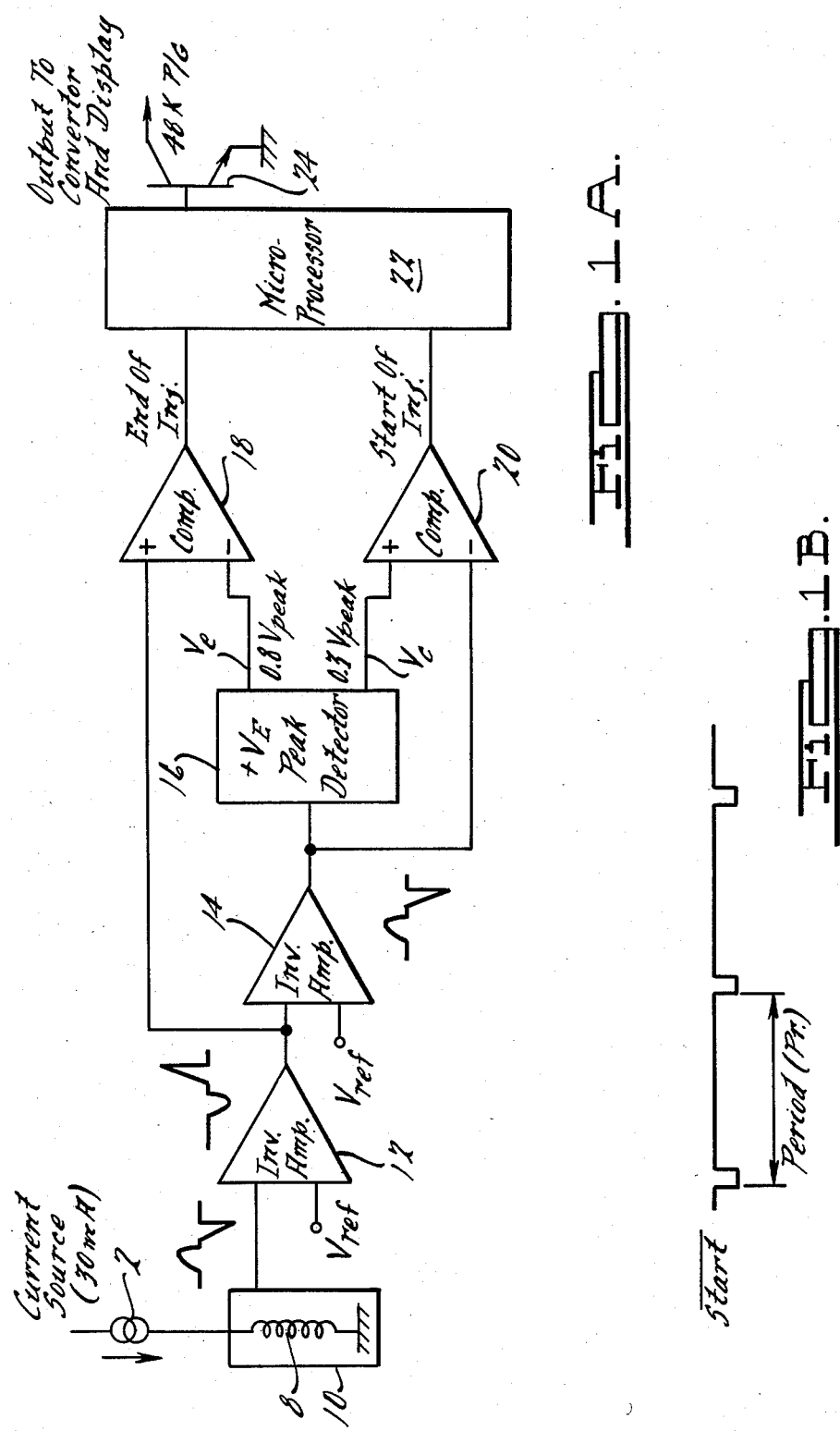

METHOD AND APPARATUS FOR DERIVING FUEL CONSUMPTION DATA FROM A HYDRAULICALLY DRIVEN FUEL INJECTOR

BACKGROUND OF THE INVENTION

1. Field of the Invention

The present invention is directed to the field of fuel consumption measurement and more specifically to the area of such measurement as applied to internal combustion engines utilizing hydraulically driven fuel injectors.

2. Description of the Prior Art

Techniques for deriving fuel consumption information from aspirated internal combustion engines is conventionally performed by inserting a fuel flow sensor in the fuel line since all fuel pumped through such a line is consumed by the engine. Such a fuel flow sensor is illustrated in U.S. Pat. No. 3,867,840.

The obtaining of fuel consumption information from internal combustion engines which employ injector valves has required other measuring techniques since only a portion of the fuel travelling in the fuel line, under pressure, is actually consumed. The portion that is not injected into the engine is returned to the fuel storage tank.

One technique used to derive fuel consumption information from internal combustion engines which employ electronically controlled fuel injectors, involves monitoring the length of pulses sent to open injector valves. This technique is shown in U.S. Pat. No. 4,002,062 and relies on the assumption that the injector valves provide a certain volume of fuel to the engine in response to each pulse.

Injectors that are mechanically driven from a cam shaft on an associated engine are opened a predetermined amount for the injection of fuel for periods of time that are directly related to the speed of the engine. Throttle variations are translated to fuel pressure variations at the injector. U.S. Pat. No. 4,062,230 describes a technique for measuring fuel consumption information in such an environment by monitoring pressure on the line.

SUMMARY OF THE INVENTION

The present invention is intended to provide fuel consumption information for an internal combustion engine which utilizes hydraulically actuated fuel injectors, such as that illustrated in U.S. Pat. No. 3,344,663. Hydraulic fuel injectors are typically actuated to open for a duration determined by an associated hydraulic injector pump that is synchronously driven by the engine. Engine speed and throttle settings determine the time period and the pressure at which the fuel is applied to each injector valve.

A coil sensor on an injector is utilized to monitor the opening and closing of the injector valve and output a signal reflecting the movement of that valve. Analysis of each monitored injector signal provides such information as engine speed and duration of each injector valve opening. That information is processed by comparing it with known parameters of the engine and the injector valve, to determine the quantity of fuel consumed each time the injector valve is opened. That volume information is output in the form of a pulse train with a known number of pulses per quantity of consumed fuel to a utilization device such as a distance per fuel consumption (miles per gallon MPG or liters per 100 kilometers-LKm) or a fuel consumption per time (gallons per hour -GPH orliters per hour -LPH) calculator for computation in a known manner.

It is therefore an object of the present invention to provide an accurate and efficient method for determining the volume of fuel consumed by an internal combustion engine utilizing hydraulically driven fuel injectors.

It is another object of the present invention to provide an electrical apparatus for performing the method described above.

It is a further object of the present invention to provide a fuel consumption measuring apparatus that is compatible with conventional fuel consumption over distance or time computational devices.

BRIEF DESCRIPTION OF THE DRAWINGS

FIG. 1a is a block diagram of a preferred embodiment of the present invention.

FIG. 1b is a waveform diagram that illustrates the method of determining engine speed.

FIG. 2b is a waveform diagram illustrating the "start of injection" signal derived from the pulse shown in FIG. 2a.

FIG. 2c is a waveform diagram illustrating the "end of injection" signal derived from the pulse shown in FIG. 2a.

FIG. 2e is a waveform diagram illustrating the gated pulse train that is output from the apparatus shown in FIG. 1a.

DETAILED DESCRIPTION OF THE PREFERRED EMBODIMENT

The preferred embodiment of the invention is exemplified in the circuit shown in FIG. 1a. In that figure, a block diagram illustrates the functional electrical circuits that are employed to carry out the steps of the method of deriving fuel consumption information from a hydraulically driven fuel injector.

Figure 2A:
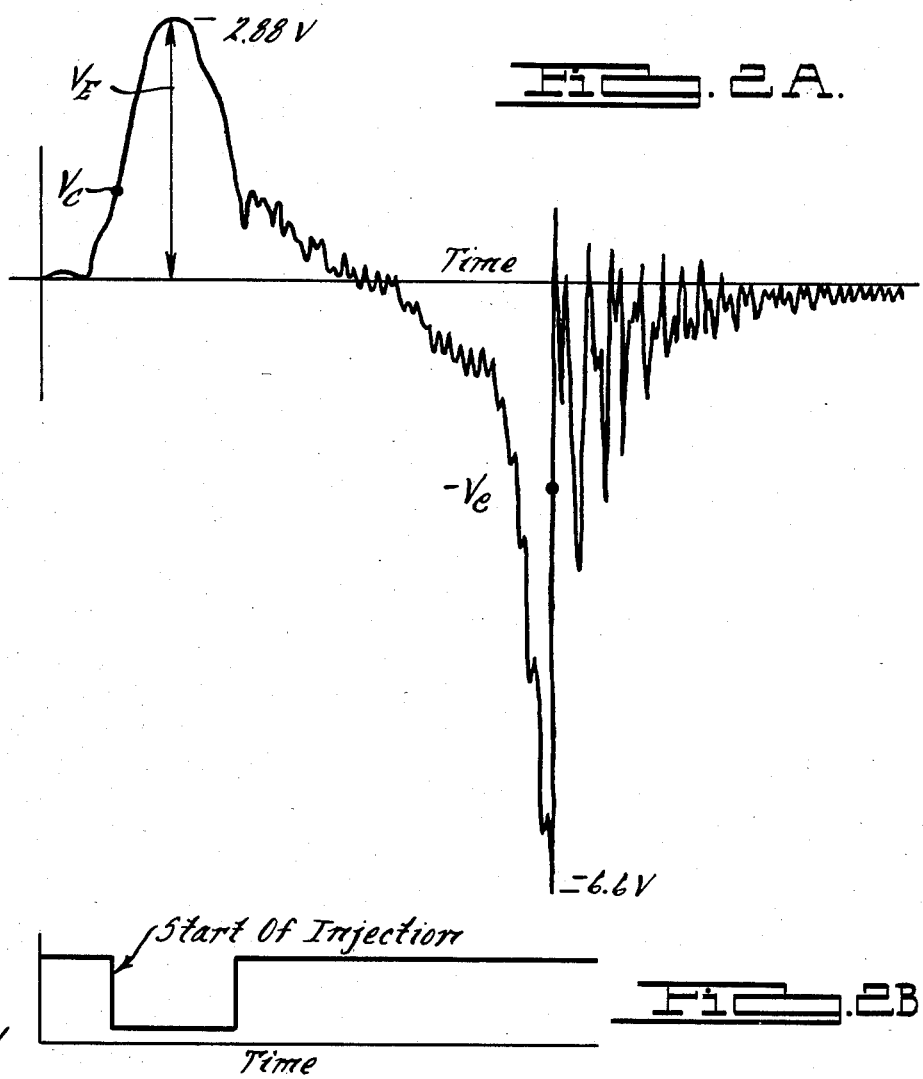
FIG. 2a is a waveform diagram illustrating a typical pulse output from the injector valve sensor.

The hydraulically driven fuel injector 10 employs a sensing coil 8 that monitors movement of the injector valve within the injector 10. A current source 2 provides a constant current of appoximately 30 milliamps to the coil 8. Whenever the injector valve within the fuel injector 10 is moved, the inductance of the coil 8 changes and a voltage pulse is output therefrom. The voltage pulse shown output from the sensing coil 8 is detailed in FIG. 2a, over one injection cycle. The initial positive going portion of the signal reflects the opening movement of the injector valve; and the maximum positive peak $V_E$ of the signal reflects the maximum velocity of the injector valve movement. The signal then approaches its base level, when the injector valve reaches the maximum opening. Subsequently, the signal moves in a negative direction from its base level, due to the closing action of the injector valve. As can be seen from FIG. 2a, a typical pulse signal from the sensor coil 8 results in oscillation noise signals at various levels. Accordingly, threshhold levels to determine the opening and closing actions of the injector valve are set above the expected noise peaks.

Referring again to FIG. 1a, the signal from the sensor coil 8 is fed to an inverting amplifier 12 which acts as a buffer amplifier to prevent loading of the coil. The output of the inverter 12 is connected to a second inverting amplifier 14 so as to reproduce the signal output from the sensor coil 8. The output from the inverter 14 is fed to a positive peak detector 16 which detects the value $V_E$ of the positive peak shown in FIG. 2a. Through a conventional voltage divider network, the peak detector 16 provides threshold reference voltage levels of $V_c$ and $V_e$. $V_c$ is selected as being approximately 33% of the positive peak ($0.3V_E$) and $V_e$ is selected as being approximately 80% of the positive peak ($0.8V_E$).

The $V_c$ voltage level is output from the peak detector 16 to a noninverting input terminal of a comparator circuit 20, while the inverting input terminal of the comparator 20 is connected to receive the output of the inverting amplifier 14. Therefore, when the next subsequent signal is received from the sensor coil 8, and the positive portion thereof exceeds the $V_c$ voltage level, the comparator 20 output voltage goes from a high level to a relatively low level and returns to the high level when the signal voltage from the amplifier 14 returns below the $V_c$ voltage level.

Figure 2B:
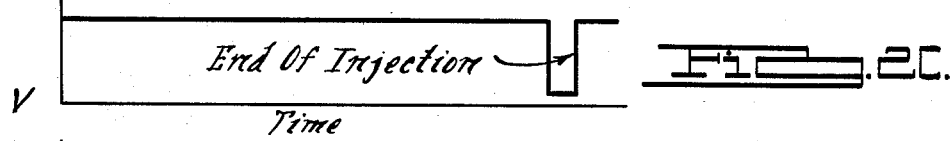
Figure 2C:
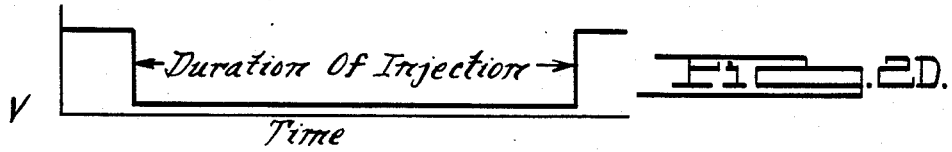
Figure 2D:
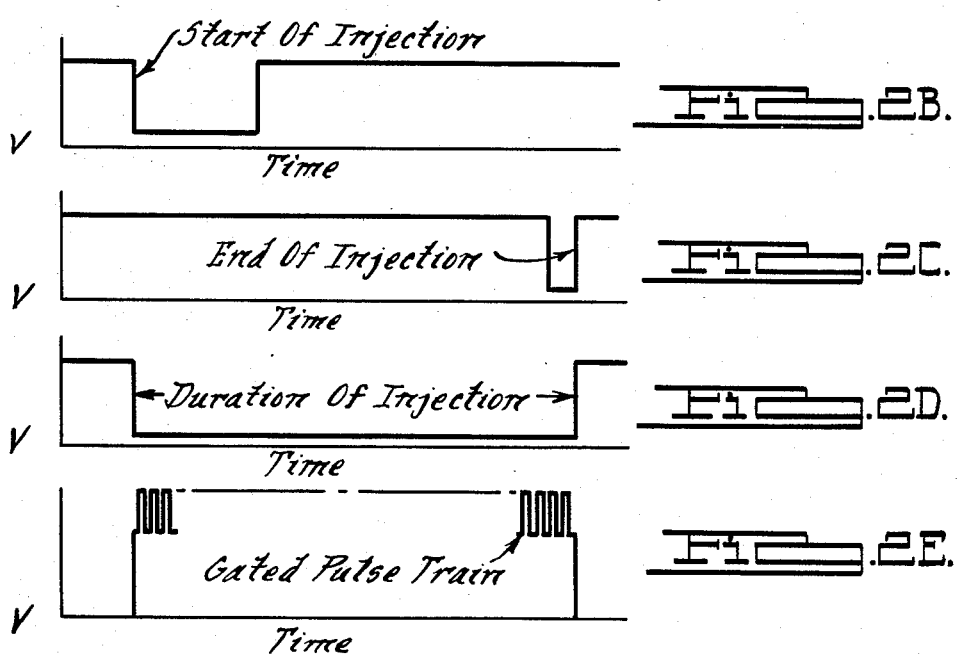
FIG. 2d is a waveform diagram illustrating the "duration of the injection" signal derived from the signals shown in FIGS. 2b and 2c.
Figure 2E:
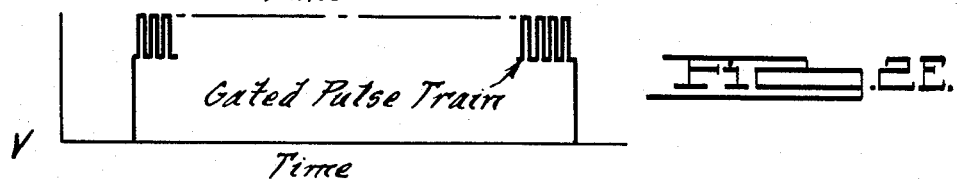

The signal output from the comparator 20 is shown in FIG. 2b, wherein the high to low change of state in that output level defines the "start-of-injection". This change of state also provides for a timing signal that defines the period (PR) of time occurring between successive start-of-injection pulses (FIG. 1b). The $V_e$ voltage level is output from the peak detector 16 to an inverting input terminal of a comparator circuit 18, while the noninverting input terminal of that comparator circuit 18 receives the inverted output from the amplifier 12. Accordingly, when the closing valve portion of the next subsequent signal from the sensor 8 exceeds $V_e$, the output of the comparator 18 changes states from a high level to a low level and changes back again when the closing portion of the signal returns below $V_e$ on the way to its base value. The return to the base value portion is defined as the "end-of-injection" signal and is shown in FIG. 2c.

Figure 3:
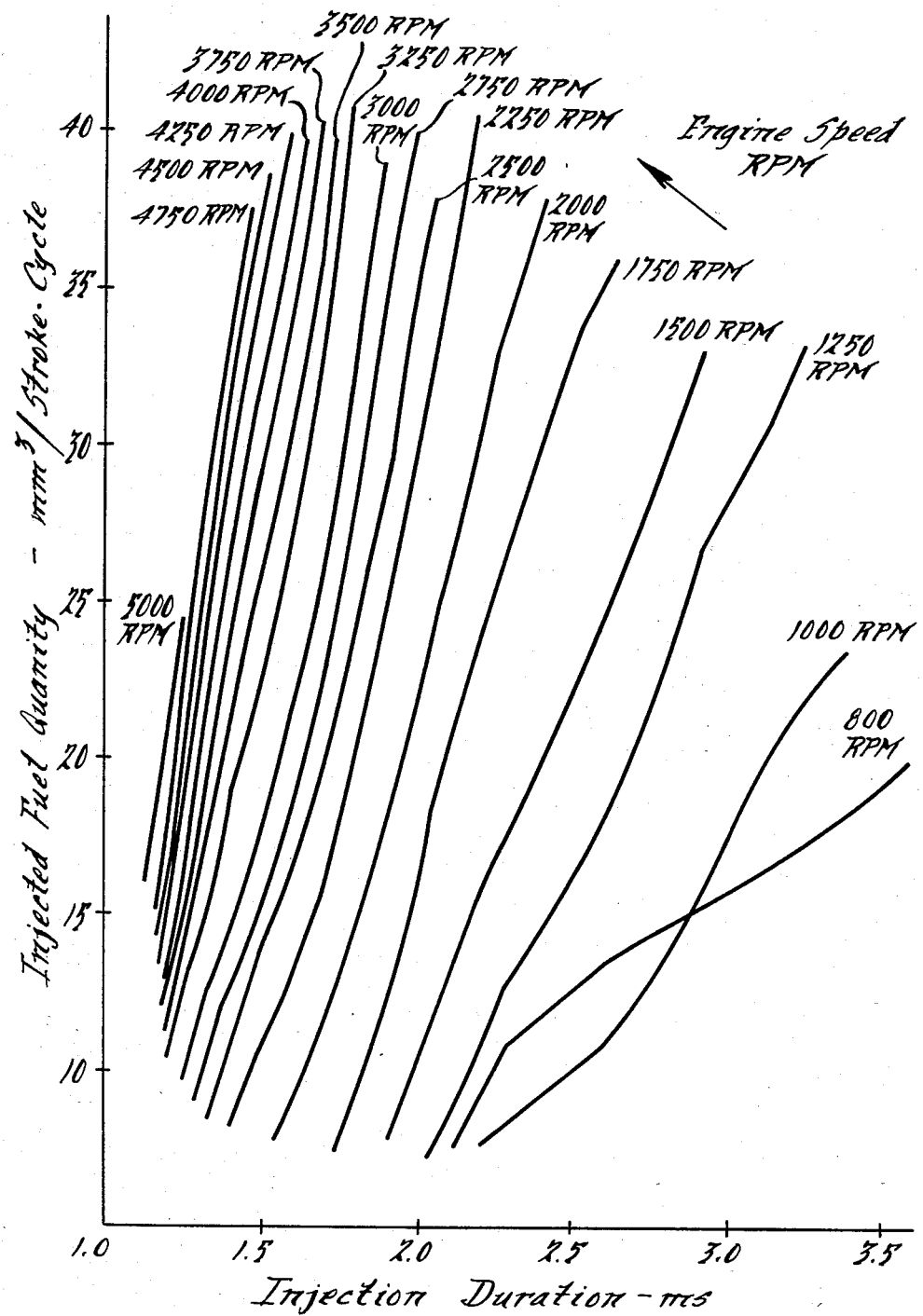
FIG. 3 is a graphical plot of injection duration time periods versus injected fuel quantity for various engine speeds.

The outputs from comparators 18 and 20 are fed to a microprocessor 22, which is programmed according to previously collected data shown in FIG. 3 so as to correlate the determined injection duration period from the start-of-injection to the end-of-injection against the engine speed and provide an output signal corresponding to the previously determined and stored injected fuel quantity.

In discussing the programmed data in FIG. 3, it should also be noted that the engine speed is derived from the period (PR) information by the relationship $$RPM = \frac{Pulse}{(PR) \, Sec} \times \frac{2 \, Rev}{Pulse} \times \frac{60 \, Sec}{Min} = \frac{Rev}{Min}$$

The above relationship reflects the fact that four stroke engines provide two cycles of rotation for every fuel stroke. Therefore, by measuring the period (PR) between start-of-injection signals, the engine speed is directly derived by the microprocessor 22.

As can be seen by the plot in FIG. 3, injection duration is not a function of engine speed. Rather, a particular injection duration can occur at various engine speeds. This is due to the fact that the injectors are hydraulically driven from an injector pump that is synchronously rotated with the engine but has a variable injector pressure which is dictated by the throttle setting. The applied pressure, in conjunction with the engine speed determine the injection duration.

The microprocessor 22 is programmed to take into account that the injection duration measurements obtained from the sensor 8 reflect the injection quantity for a single injector. When more than one injector is employed, the microprocessor is appropriately programmed to multiply the quantity results from the sensed injector by the number of injectors used, to provide an appropriate output signal to the computational device which conventionally provides a display of fuel consumption with respect to distance traveled or elapsed time.

The particular computational device with which this invention is associated, requires that any associated fuel consumption gauge supply 48,000 pulses per gallon of consumed fuel. Accordingly, the microprocessor 22 is programmed to gate the number of pulses through the output transistor 24 to the utilization device corresponding to the measured fuel consumption and the calibrated number of pulses.

It will be apparent that many modifications and variations may be implemented without departing from the scope of the novel concept of this invention. Therefore, it is intended by the appended claims to cover all such modifications and variations which fall within the true spirit and scope of the invention.

I claim:

1. A circuit for monitoring a hydraulically driven fuel injector valve comprising:
    a sensor means on said injector valve for producing an electrical signal proportional to the velocity of valve movement each time said valve is driven into opened and closed positions;
    means connected to said sensor means for detecting the peak valve of said electrical signal each time said valve is driven into its opened position and providing first and second threshold voltages having values proportional to said detected peak value; and
    comparator means for comparing the next subsequent electrical signal against said first and second threshold voltages to provide a first output pulse during the time the compared electrical signal exceeds the first threshold voltage and a second output pulse during the time the compared electrical signal is below said second threshold voltage.

2. A circuit as in claim 1, whereby a reference is established when the valve is not being driven, said electrical signal is above the established reference while said valve is being opened and below said reference while said valve is being closed, and said second threshold voltage is below said established reference.

3. A circuit as in claim 2, wherein the occurrence of the beginning of said first output pulse reflects the start of the injection cycle for said injection valve and the end of said second output pulse reflects the end of the injection cycle as calibrated against the immediately preceding electrical signal.

4. A circuit as in claim 1, wherein said sensor means includes a sensor coil mounted on said injector valve and a constant current source connected to said sensor coil.

* * * * *

UNITED STATES PATENT AND TRADEMARK OFFICE
CERTIFICATE OF CORRECTION

PATENT NO. : 4,553,207
DATED : November 12, 1985
INVENTOR(S) : Marcello Veneziano It is certified that error appears in the above-identified patent and that said Letters Patent are hereby corrected as shown below:

In claim 1, line 39 substitute --value-- for "valve".

Signed and Sealed this

Eleventh Day of February 1986

[SEAL]

Attest:

DONALD J. QUIGG

Attesting Officer

Commissioner of Patents and Trademarks